(12) United States Patent
Jiang et al.

(10) Patent No.: US 10,459,751 B2
(45) Date of Patent: Oct. 29, 2019

(54) VARYING FIRMWARE FOR VIRTUALIZED DEVICE

(71) Applicant: ATI Technologies ULC, Markham (CA)

(72) Inventors: Yinan Jiang, Markham (CA); Ahmed M. Abdelkhalek, Markham (CA); Guopei Qiao, Markham (CA); Andy Sung, Markham (CA); Haibo Liu, Markham (CA); Dezhi Ming, Markham (CA); Zhidong Xu, Markham (CA)

(73) Assignee: ATI TECHNOLOGIES ULC., Markham, Ontario (CA)

( * ) Notice: Subject to any disclaimer, the term of this patent is extended or adjusted under 35 U.S.C. 154(b) by 141 days.

(21) Appl. No.: 15/639,971

(22) Filed: Jun. 30, 2017

(65) Prior Publication Data
US 2019/0004842 A1    Jan. 3, 2019

(51) Int. Cl.
*G06F 9/455*   (2018.01)
*G06F 9/22*    (2006.01)
*G06F 9/48*    (2006.01)

(52) U.S. Cl.
CPC .......... *G06F 9/45558* (2013.01); *G06F 9/226* (2013.01); *G06F 9/4881* (2013.01); *G06F 2009/4557* (2013.01); *G06F 2009/45575* (2013.01)

(58) Field of Classification Search
CPC .... G06F 9/45558; G06F 9/226; G06F 9/4881; G06F 2009/45575; G06F 2009/4557
See application file for complete search history.

(56) References Cited

U.S. PATENT DOCUMENTS

| 8,201,732 B1* | 6/2012 | Kropf ................. G06Q 20/108 |
| | | 235/379 |
| 8,490,868 B1* | 7/2013 | Kropf ................. G07F 19/206 |
| | | 235/379 |
| 8,776,060 B2 | 7/2014 | Jess et al. |
| 9,940,123 B1* | 4/2018 | Ayoub ..................... G06F 8/65 |
| 10,055,234 B1* | 8/2018 | Rao ........................ G06F 9/441 |
| 2004/0117793 A1* | 6/2004 | Shaylor ................ G06F 9/4856 |
| | | 718/100 |
| 2005/0081212 A1* | 4/2005 | Goud .................. G06F 9/45558 |
| | | 718/107 |

(Continued)

*Primary Examiner* — Adam Lee
(74) *Attorney, Agent, or Firm* — Volpe and Koenig, P.C.

(57) ABSTRACT

A technique for varying firmware for different virtual functions in a virtualized device is provided. The virtualized device includes a hardware accelerator and a microcontroller that executes firmware. The virtualized device is virtualized in that the virtualized device performs work for different virtual functions (with different virtual functions associated with different virtual machines), each function getting a "time-slice" during which work is performed for that function. To vary the firmware, each time the virtualized device switches from performing work for a current virtual function to work for a subsequent virtual function, one or more microcontrollers of the virtualized device examines memory storing addresses for firmware for the subsequent virtual function and begins executing the firmware for that subsequent virtual function. The addresses for the firmware are provided by a corresponding virtual machine at configuration time.

20 Claims, 5 Drawing Sheets

(56) References Cited

U.S. PATENT DOCUMENTS

| | | | | |
|---|---|---|---|---|
| 2006/0215659 A1* | 9/2006 | Rothman | | H04L 41/12 370/392 |
| 2009/0113422 A1* | 4/2009 | Kani | | G06F 9/5077 718/1 |
| 2009/0182967 A1* | 7/2009 | Cardona | | G06F 9/45533 711/165 |
| 2010/0306773 A1* | 12/2010 | Lee | | G06F 9/5077 718/1 |
| 2011/0029821 A1* | 2/2011 | Chow | | G06F 11/3476 714/45 |
| 2011/0078791 A1* | 3/2011 | Prakash | | G06F 21/55 726/22 |
| 2011/0131447 A1* | 6/2011 | Prakash | | G06F 21/572 714/19 |
| 2011/0151836 A1* | 6/2011 | Dadu | | H04L 63/0853 455/411 |
| 2011/0154023 A1* | 6/2011 | Smith | | G06F 21/78 713/155 |
| 2011/0179415 A1* | 7/2011 | Donnellan | | G06F 9/45558 718/1 |
| 2011/0261885 A1* | 10/2011 | de Rivaz | | H04N 19/42 375/240.16 |
| 2012/0017271 A1* | 1/2012 | Smith | | G06F 9/4401 726/19 |
| 2012/0117555 A1* | 5/2012 | Banerjee | | G06F 8/65 717/168 |
| 2012/0117562 A1* | 5/2012 | Jess | | G06F 8/656 718/1 |
| 2012/0180046 A1 | 7/2012 | Jacobs et al. | | |
| 2012/0210332 A1* | 8/2012 | Zhao | | G06F 9/4843 718/107 |
| 2012/0291021 A1* | 11/2012 | Banerjee | | G06F 8/654 717/173 |
| 2013/0007323 A1* | 1/2013 | Arges | | G06F 9/5077 710/200 |
| 2013/0016002 A1 | 6/2013 | Graham et al. | | |
| 2013/0174144 A1 | 7/2013 | Cheng et al. | | |
| 2014/0237469 A1* | 8/2014 | Tsirkin | | G06F 9/45558 718/1 |
| 2015/0293776 A1* | 10/2015 | Persson | | G06F 9/45558 718/1 |
| 2016/0205069 A1* | 7/2016 | Blocher | | H04L 63/02 726/12 |
| 2016/0328255 A1* | 11/2016 | Dow | | H04L 63/102 |
| 2017/0277554 A1* | 9/2017 | Oehrlein | | G06F 9/45558 |

* cited by examiner

VARYING FIRMWARE FOR VIRTUALIZED DEVICE

BACKGROUND

Computer virtualization is a technique in which a single set of hardware is shared among different virtual instances of a computer system. Each instance—a virtual machine ("VM")—believes that it owns a whole, hardware computer system, but in reality, the hardware resources of a computer system are shared among the different VMs. Advances in virtualization, including advances in virtualization for devices other than the CPU, system memory, and the like, are constantly being made.

BRIEF DESCRIPTION OF THE DRAWINGS

A more detailed understanding can be had from the following description, given by way of example in conjunction with the accompanying drawings wherein.

DETAILED DESCRIPTION

A technique for varying firmware for different virtual functions in a virtualized device is provided. The virtualized device includes a hardware accelerator and a microcontroller that executes firmware. The virtualized device is virtualized in that the virtualized device performs work for different virtual functions (with different virtual functions associated with different virtual machines), each function getting a "time-slice" during which work is performed for that function. To vary the firmware, each time the virtualized device switches from performing work for a current virtual function to work for a subsequent virtual function, one or more microcontrollers of the virtualized device examines memory storing addresses for firmware for the subsequent virtual function and begins executing the firmware for that subsequent virtual function. The addresses for the firmware are provided by a corresponding virtual machine at configuration time.

Figure 1:
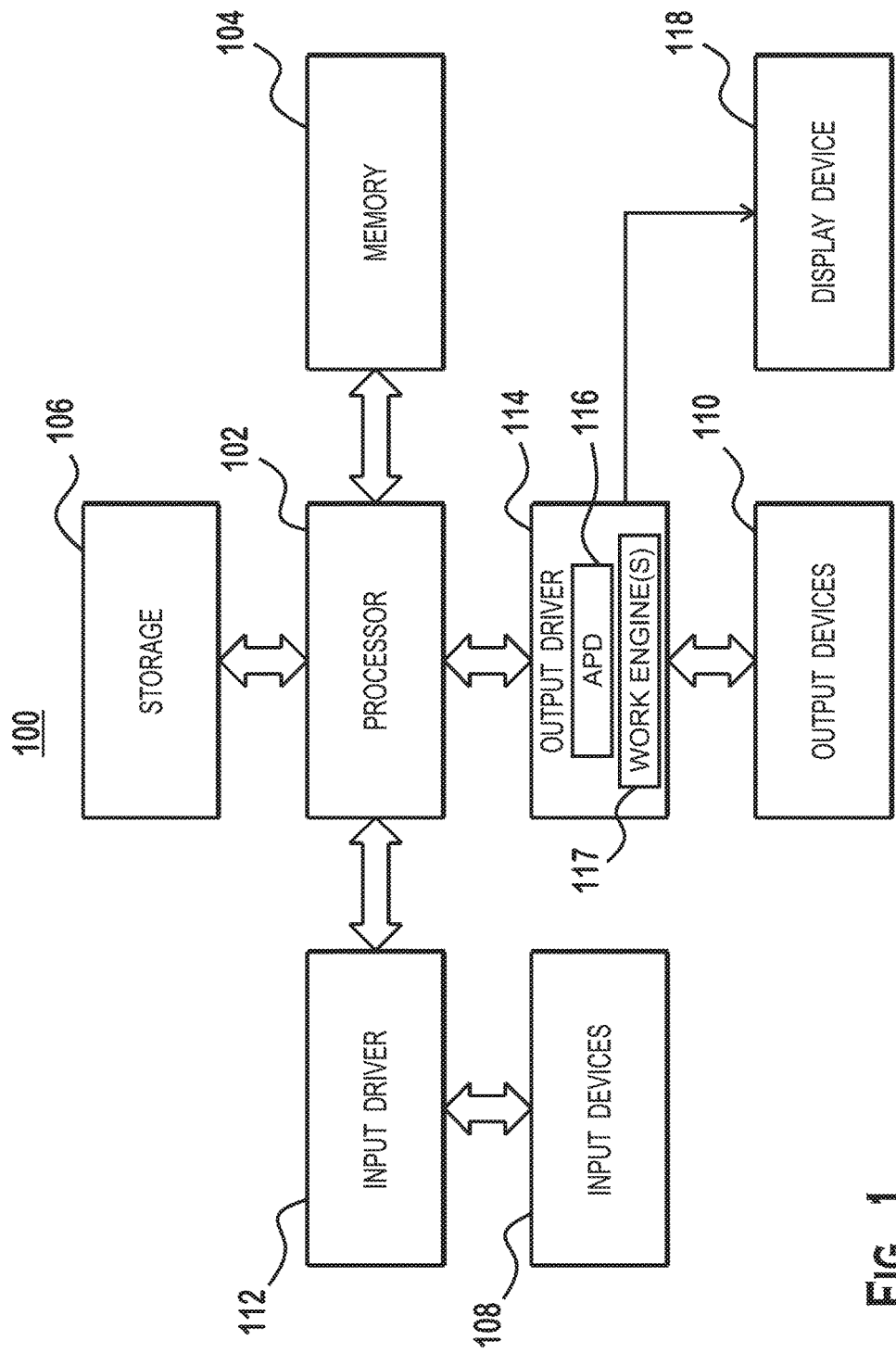
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118, which, in some examples, is a physical display device or a simulated device that uses a remote display protocol to show output. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein. The output driver 114 also includes one or more work engines 117 that are virtualized. Work engines 117 perform work at the request of the processor 102, APD 116, or other entity. In one example, the work engines 117 include a video encoder engine, such as an engine to encode a frame of image data generated by the APD 116 into compressed video data. Such a video encoding work engine 117 may encode data according to a standard such as the high efficiency video encoding (HEVC, also known as H.265) codec, the advanced video coding (AVC, also known as H.264) codec, the VP9 video codec, or any other codec. In other examples, work engines 117 may perform other types of encoding work or other types of non-encoding work, such as decoding or any other work.

The processor 102 is configured to support a virtualizations scheme in which multiple virtual machines execute on the processor 102. Each virtual machine ("VM") "appears" to software executing in that VM as a completely "real" hardware computer system, but in reality comprises a virtualized computing environment that may be sharing the device 100 with other virtual machines. Virtualization may be supported fully in software, partially in hardware and partially in software, or fully in hardware. The APD 116 supports virtualization, meaning that the APD 116 can be shared among multiple virtual machines executing on the processor 102, with each VM "believing" that the VM has full ownership of a real hardware APD 116. For virtualization, VMs take turns executing on the processor 102. A switch from one VM to another is referred to as a "virtualization context switch" herein. One or more of the work engines 117 also supports virtualization.

Figure 2:
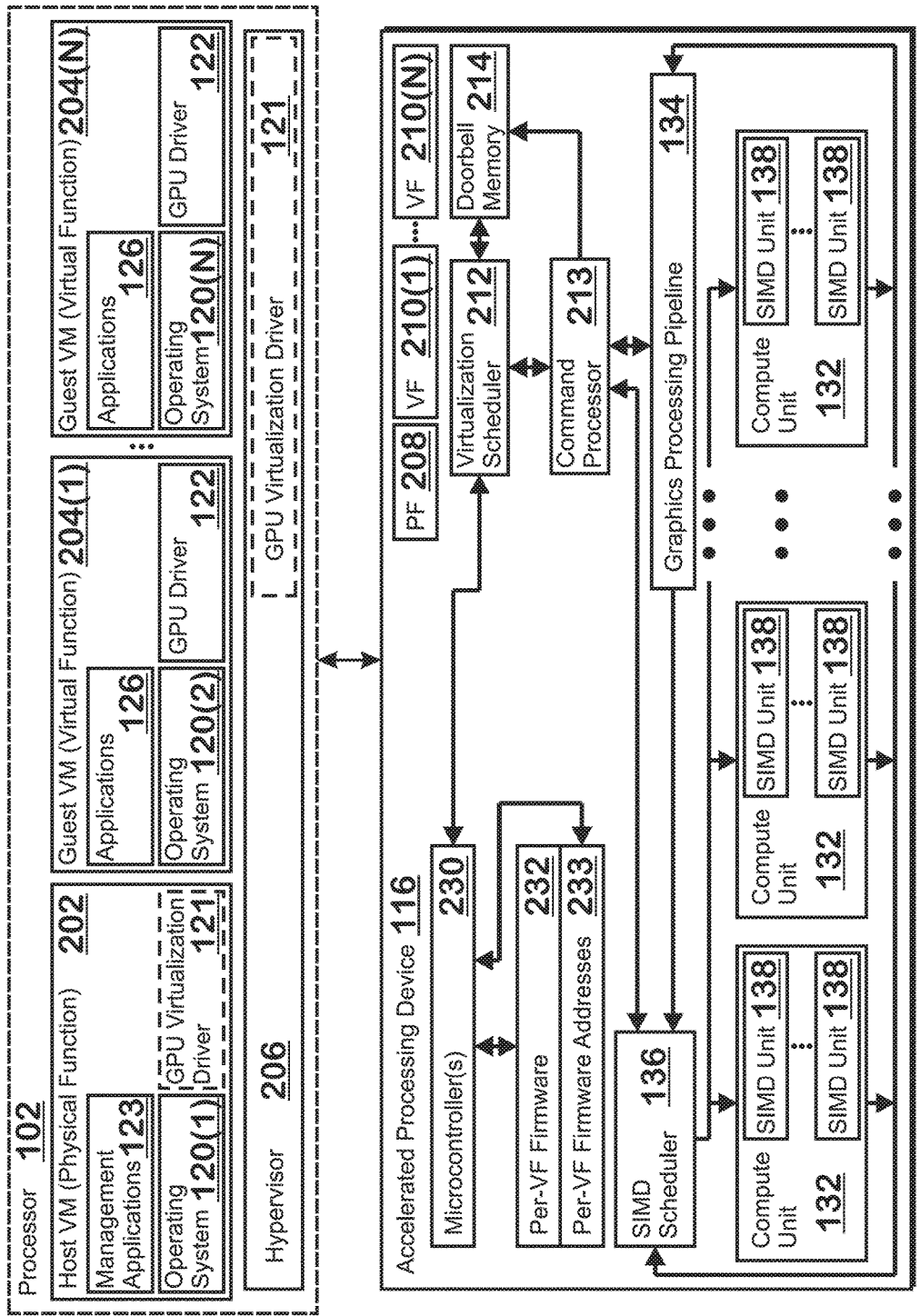
FIG. 2 is a block diagram of the device of FIG. 1, illustrating details related to virtualization, according to an example.

FIG. 2 illustrates details of the device 100 and the APD 116 related to virtualization, according to an example. The processor 102 supports multiple virtual machines. A specialized host virtual machine 202, is not a "general purpose" VM like the guest VMs 204, but instead performs support for virtualization of the APD 116 for use by the guest VMs 204. A hypervisor 206 provides virtualization support for the virtual machines, which includes a wide variety of functions such as managing resources assigned to the virtual machines, spawning and killing virtual machines, handling system calls, managing access to peripheral devices, managing memory and page tables, and various other functions.

The APD 116 supports virtualization by allowing time-based sharing of the APD 116 between the virtual machines. On the APD 116, the host VM 202 is mapped to a physical function 208 and guest VMs 204 are mapped to virtual functions 210. "Physical functions" are essentially an addressing parameter in the peripheral component interconnect express ("PCIe") standard. More specifically, physical functions allow communications involving a device coupled to a PCIe interconnect fabric to specify a particular physical function of the device so that the device is able to handle the communications according to functionality specifically assigned to that physical function. In one example, a physical function is associated with regular graphics rendering on a graphics processing device such as the APD 116. Herein, a single physical function is described, but the teachings of the present disclosure apply to APDs 116 for which more than one physical function is active.

Virtual functions are a feature of the PCIe standard that facilitates hardware virtualization and also acts as an addressing parameter in the PCIe standard. Typically, a set of virtual functions is associated with a particular physical function. Each virtual machine is assigned a different virtual function, with the hypervisor 206 managing the correlation between VMs and virtual functions. This correlation between virtual functions and virtual machines is mostly true in the system of FIG. 2, except that the host VM 202 is able to access the physical function 208 as well as the different virtual functions 210. In that sense, the host VM 202 acts as a sort of "master virtual machine" for APD virtualization.

As described above, physical functions and virtual functions are addressing parameters in PCIe, where transactions made across PCIe specify or are intended for a particular virtual function and/or physical function and the processor 102 or APD 116 responds accordingly (note, some ways of addressing over PCIe do not explicitly specify a virtual function or physical function; for example, transactions over PCIe can be routed by memory address instead of explicitly by function, where the devices implicitly understand which function is associated with a particular memory address). The processor 102 directs transactions for a particular VM to the appropriate virtual function of the APD 116 via a memory mapping mechanism. More specifically, when a virtual machine makes an access to the APD 116, the memory address used to make that access is translated from a guest physical address to a system physical address. The particular system physical address used is mapped to a particular virtual function of the APD 116 by a memory mapping mechanism and thus the transaction made is routed to the APD 116 and appropriate virtual function via the mapping information.

Sharing the APD 116 among the different virtual machines is accomplished by time-dividing the operations of the APD 116 amongst the different virtual machines. A virtualization scheduler 212 performs this task, scheduling different virtual machines for operation by switching between work for the different virtual machines as the execution time assigned to the virtual machines elapse. Although the APD 116 is shared among the different virtual machines, each virtual machine perceives that it has an individual instance of a real, hardware APD 116. Although the terms "virtual function" and "physical function" refer to addressing parameters of the PCIe standard, because these functions map to different VMs, the logical instance of an APD 116 assigned to a particular virtual machine will also be referred to herein as either a virtual function or a physical function. In other words, this disclosure may use terminology such as "the virtual function performs a task," (or physical function) or "an operation is performed on of for a virtual function," (or physical function) and this terminology should be read to mean that the APD 116 performs that task for the time-slice assigned to the VM associated with that particular virtual or physical function, or on behalf of the VM associated with that virtual or physical function.

The host VM 202 and the guest VMs 204 have operating systems 120. The host VM 202 has management applications 123 and a GPU virtualization driver 121. The guest VMs 204 have applications 126, an operating system 120, and a GPU driver 122. These elements control various features of the operation of the processor 102 and the APD 116.

As stated above, the host VM 202 configures aspects of virtualization in the APD 116 for the guest VMs 204. Thus the host VM 202 includes an operating system 120 that supports execution of other elements such as management applications 123 and a GPU virtualization driver 121. The GPU virtualization driver 121 is not a traditional graphics driver that simply communicates with and sends graphics rendering (or other) commands to the APD 116, without understanding aspects of virtualization of the APD 116. Instead, the GPU virtualization driver 121 communicates with the APD 116 to configure various aspects of the APD 116 for virtualization. In one example, the GPU virtualization driver 121 manages parameters related to the time-slicing mechanism for sharing the APD 116 among the different VMs, controlling parameters such as how much time is in each time-slice, how switching is performed between different virtual functions, and other aspects. The GPU virtualization driver 121 may be separate from a different graphics driver that does send graphics-related commands to the APD 116 or may be incorporated into such a graphics-related driver. In other words, the virtualization-related functionality may be in a separate driver than graphics functionality or may be included in a single driver with the graphics functionality. The management applications 123 perform one or more tasks for managing virtualization and/or that involve data from two or more different guest VMs 204. In one example, the host VM 202 performs a desktop compositing function through a management application 123, where the desktop compositing function has access to rendered frames from the different guest VMs 204 and composites those frames into a single output view.

The guest VMs 204 include an operating system 120, a GPU driver 122, and applications 126. The operating system 120 is any type of operating system that could execute on processor 102. The GPU driver 122 is a "native" driver for the APD 116 in that the GPU driver 122 controls operation of the APD 116 for the guest VM 204 on which the GPU driver 122 is running, sending tasks such as graphics rendering tasks or other work to the APD 116 for processing. The native driver may be an unmodified or only slightly modified version of a device driver for a GPU that would exist in a bare-metal non-virtualized computing system.

Although the GPU virtualization driver 121 is described as being included within the host VM 202, in other implementations, the GPU virtualization driver 121 is included in the hypervisor instead 206. In such implementations, the host VM 202 may not exist and functionality of the host VM 202 may be performed by the hypervisor 206.

The operating systems 120 of the host VM 202 and the guest VMs 204 perform standard functionality for operating systems in a virtualized environment, such as communicating with hardware, managing resources and a file system, managing virtual memory, managing a network stack, and many other functions. The GPU driver 122 controls operation of the APD 116 for any particular guest VM 204 by, for example, providing an application programming interface ("API") to software (e.g., applications 126) to access various functionality of the APD 116. The driver 122 also includes a just-in-time compiler that compiles programs for execution by processing components (such as the SIMD units 138 discussed in further detail below) of the APD 116. For any particular guest VM 204, the GPU driver 122 controls functionality on the APD 116 related to that guest VM 204, and not for other VMs.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102. A command processor 213 accepts commands from the processor 102 (or another source), and delegates tasks associated with those commands to the various elements of the APD 116 such as the graphics processing pipeline 134 and the compute units 132. The VMs inform the APD 116 regarding new tasks for execution via a doorbell mechanism, using the doorbell memory 214.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The virtualization scheduler 212 manages time-sharing of the APD 116 among the different virtual machines. In each time-slice, the virtualization scheduler 212 permits work for the virtual machine associated with that time-slice to proceed in the APD 116. The doorbell memory 214 stores doorbells, which are indications that work is ready to be performed on the APD 116 for a particular virtual machine. The doorbell mechanism operates asynchronously with respect to which virtual machine is currently scheduled for work on the APD 116. This means that a particular virtual machine may place a doorbell in doorbell memory 214 at a time when tasks for a VM other than the VM that placed the doorbell in the doorbell memory 214 are being executed on the APD 116.

Virtualization on the APD 116 works as follows. The virtualization scheduler 212 manages time-slices on the APD 116 for the VMs (both the host VM 202 and the guest VMS 204) that share the APD 116. The virtualization scheduler 212 tracks the time-slices, stopping work on the APD 116 when a time-slice for a particular VM has expired and starting work for the VM having the next time-slice. Thus, the virtualization scheduler 212 switches between different VMs that have work to be executed on the APD 116

To begin work for a particular time-slice associated with a particular VM, the virtualization scheduler 212 selects a virtual function associated with that VM to run and causes the command processor 213 to begin running for that VM. The command processor 213 examines a doorbell for that VM, where the doorbell is a pointer into a command buffer that indicates where commands for processing are stored. The command processor 213 executes the commands indicated by the doorbell, executing those commands on the APD 116, such as in the graphics processing pipeline 134 and/or for general purpose computing work.

Note that the other portions of the APD 116 whose functionality is not specifically described in the context of virtualization works as described above and as if no virtualization was occurring. For example, the graphics processing pipeline 134 performs operations related to graphics rendering in response to graphics rendering commands fetched by the command processor 213. For at least some of the graphics rendering commands associated with the graphics processing pipeline 134, and/or for the general purpose compute operation, SIMD scheduler 136 generates and manages wavefronts for execution on the SIMD units 138 of the compute units 132 in accordance with the commands processed by the command processor 213. In an example a command is a command to render a particular piece of geometry using, among other facilities of the graphics processing pipeline 134, a particular pixel shader program. The graphics processing pipeline 134 processes the geometry through the various stages of the graphics processing pipeline 134, such as the input assembler stage 302, hull shader stage 306, tessellator stage 308, and so on, and at the pixel shader stage 316, causes the geometry to be processed with a specific pixel shader, on the SIMD units 138. The SIMD scheduler 136, manages and schedules the wavefronts for the pixel shader for execution.

Figure 3:
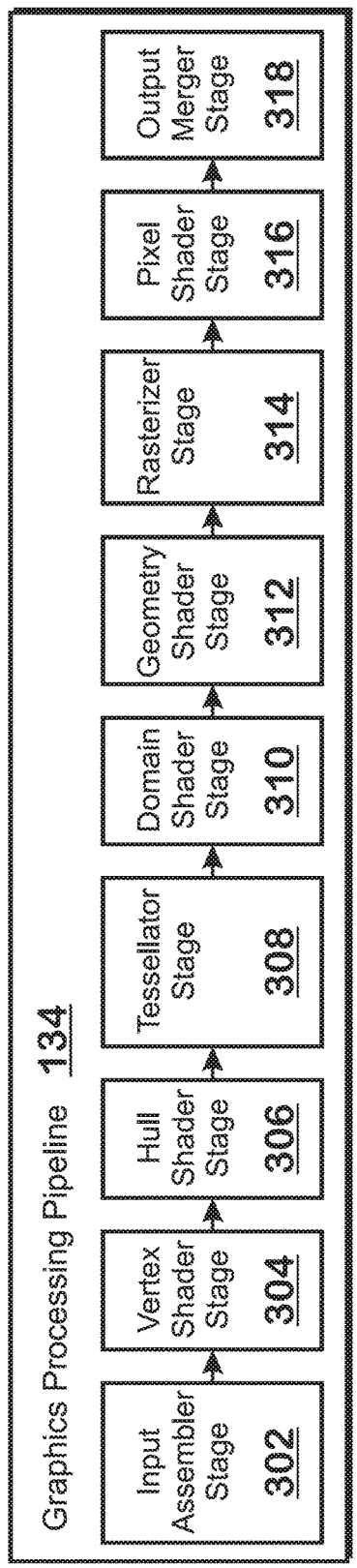
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertexes of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. In some instances, a shader program that executes on the compute units 132 performs operations for the geometry shader stage 312.

The rasterizer stage 314 accepts and rasterizes simple primitives and generated upstream. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the compute units 132.

The output merger stage 318 accepts output from the pixel shader stage 316 and merges those outputs, performing operations such as z-testing and alpha blending to determine the final color for a screen pixel.

Referring back to FIG. 2, when the virtualization scheduler 212 determines that the time-slice for the VM having work currently executing on the APD 116 has expired, the virtualization scheduler 212 causes the APD 116 to complete that work without accepting any new work (e.g., does not accept new tasks pointed to by a doorbell stored in the doorbell memory 214 but completes the tasks already "in flight" in the graphics processing pipeline 134 and/or compute units 138). Completing the tasks involves allowing the work currently in-flight in the APD 116 to complete and to have final output values written out to the target memory location. For example, for graphics rendering, output pixels would be written to the frame buffer (or other render target). (Note, stalls may occur in which work currently executing in the APD 116 either does not complete or takes an exceedingly long time to complete). The virtualization scheduler 212, GPU virtualization driver 121, management applications 123 in the host VM 202, and/or another entity may work independently or cooperate to handle stalls.

After work has completed for a particular VM, the virtualization scheduler 212 moves on to the time-slice for the next VM, causing the command processor 213 to fetch tasks for that VM based on the contents of the doorbell memory 214, and to execute those tasks on the graphics processing pipeline 134 and/or in the compute units 132 directly (e.g., for general purpose computing). This process of stopping execution of work for a time-slice that has expired and starting work for the next VM continues to provide time-sharing of the APD 116 to the different VMs.

The change between execution of work for one VM and execution of work for another VM is referred to as a "virtualization context switch" herein. In addition to stopping work for one VM and starting work for another VM, a virtualization context switch also involves saving state for the VM that is being switched away from and loading state for the VM that is being switched to. Generally, state includes values stored throughout or for the APD 116 that manage aspects of the workflow executed for the APD 116. In various examples, state may include values stored in registers (e.g., registers 216) that control how graphics is rendered, how SIMD work is executed, how shaders are executed, and control various other aspects of operations on the APD 116. Saving state involves writing the state from an in-use location (where the state values actually have effect on the operation of the APD 116) to a save state location for the VM. Loading state involves loading the state from the save state location for the VM to the in-use location.

The APD 116 includes one or more programmable microcontrollers 230 that perform one or more function on the APD 116. Each microcontroller 230 executes firmware to perform associated functionality. The firmware executed by at least one microcontroller 230 is a per-VF firmware 232. Per-VF firmware 232 is firmware for which a different version can be run for different VFs. A microcontroller 230 consults the per-VF firmware addresses 232 to learn the address of firmware to execute for any given VF. When a virtualization context switch occurs, a microcontroller 230 stops executing firmware for the current virtual function and begins executing the firmware for the subsequent function. The per-vf firmware addresses 233 are specified at initialization of the APD 116. In some examples, each per-vf firmware address is "understandable" only for a particular virtual function or the physical function and is not understandable by any other function. In one instance, this "limit" to "understandability" results from the fact that the address is in the guest virtual address space, or the guest physical address space, of the VM with which the per-vf firmware address is associated. Thus, the address has meaning only for one particular VM.

Figure 4:
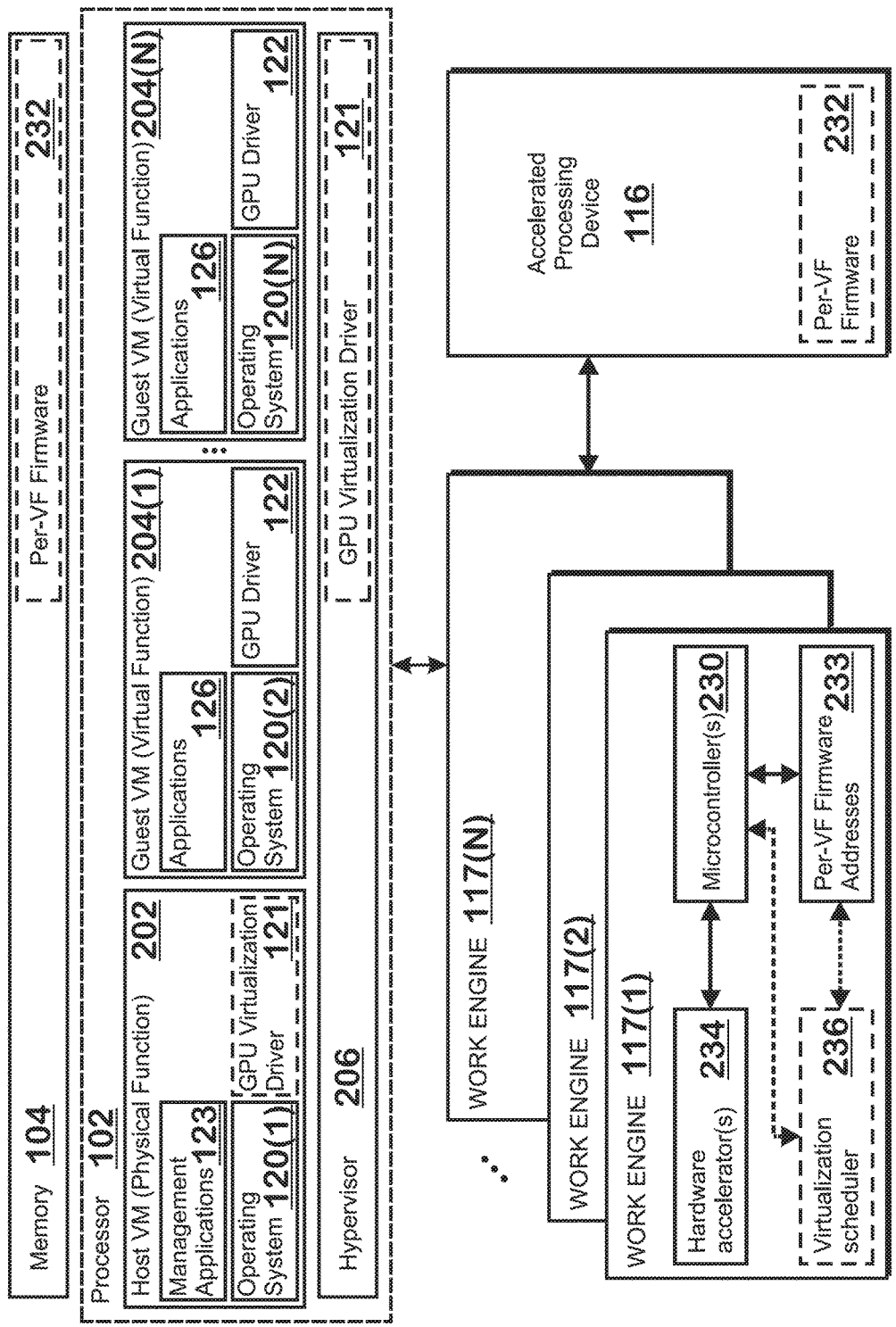
FIG. 4 is a block diagram illustrating features of the work engines of FIG. 1, related to the varying firmware, according to an example.

FIG. 4 is a block diagram illustrating features of the work engines 117 of FIG. 1, related to the varying firmware, according to an example. FIG. 4 illustrates many of the elements of FIG. 2, but does not illustrate the APD 116, which is omitted for clarity.

Various work engines 117 are illustrated. One or more of the work engines 117 include one or more a hardware accelerators 234, one or more microcontrollers 230, and one or more per-virtual function firmware addresses 233. Herein, the terms "hardware accelerator(s) 234" and "microcontroller(s) 230" may be used, and these terms indicate that a particular work engine 117 includes one or more hardware accelerators 234 and/or one or more microcontrollers 230. The various work-engines 117 are assigned to perform various types of work. One example of such work is video encoding, such as encoding of images generated by the APD 116 based on the H.264 codec.

The hardware accelerator(s) 234 and microcontroller(s) 230 of a work engine 117 cooperate to perform work assigned to the associated work engine 117. The microcontroller(s) 230 are programmable components that execute software (the per-VF firmware 232, stored in memory in the APD 116, in system memory 104, or elsewhere, as shown) to perform work. Note, the per-VF firmware 232 is illustrated with dotted lines to show that particular locations for the per-VF firmware 232 are not mandatory (e.g., the per-VF firmware 232 may be stored in the APD 116, in system memory 104, or at another location). Among other tasks, the microcontroller(s) 230 control operation of the hardware accelerator(s) 234. The microcontroller(s) 230 also optionally process data associated with the work performed by the work engine 117. The hardware accelerator(s) 234 include hardware that does not execute software, but that is considered to be "fixed function." By executing the per-VF firmware 232, the microcontroller(s) 230 configure and/or control the hardware accelerator(s) 234 to perform desired work. Typically, (though not always) the hardware accelerator(s) 234 performs the desired work faster than could be performed in software (e.g., by programmable microcontroller(s) 230 or on the processor 102).

To perform the work associated with a particular work engine 117, the microcontroller(s) 230 execute the per-VF firmware 232. The per-VF firmware 232 typically includes instructions to both configure the hardware accelerator(s) 234 to process data in a certain way, and also includes instructions to cause the microcontroller(s) 230 itself to process data in cooperation with the hardware accelerator(s) 234. In some examples, configuring the hardware accelerator(s) 234 includes setting register values. In some examples, processing data includes receiving data as input (e.g., from the processor 102 or from some other component of the device 100, including from within the work engine 117 itself), processing that data according to instructions specified by per-VF firmware 232, and passing the processed data to one or more of the hardware accelerator(s) 234. In some examples, processing data alternatively or additionally includes receiving data from one or more of the hardware accelerators(s) 234 and processing that data according to instructions of the per-VF firmware 232. After this processing, the microcontroller(s) 230 forward the processed data to an appropriate component, such as to a hardware accelerator 234 for further processing, to the processor 102 as output from the work engine 117, or to another component for other functions.

As stated above, one or more of the work engines 117 is virtualized. In a similar manner as with the APD 116, the work engine 117 switches between performing work for different virtual functions. As with the APD 116, different virtual machines are associated with different virtual functions on the work engine 117. The virtualization scheduler 236 switches between work for different virtual functions by stopping work for a current virtual function and starting work for a subsequent virtual function. The virtualization scheduler 236 is illustrated in dotted lines in order to illustrate the optional location of the virtualization scheduler 236 within the work engine 117. More specifically, in implementations without a virtualization scheduler 236 in a work engine 117, virtualization scheduling control is accomplished by a virtualization driver (not shown) executing on the processor 102 or other entity. Thus, herein, actions described as being performed by the virtualization scheduler 236 should be understood as capable of being performed by whatever entity performs virtualization scheduling. The act of switching between virtual functions on the work engine 117 is referred to as a virtualization context switch (just as with the APD 116). Note that virtualization on a work engine 117 is asynchronous with respect to virtualization of other elements of the device 100. Thus, a work engine 117 may be working on work for one virtual machine while a different virtual machine is executing on the processor 102 and while work for yet another virtual machine is executing on the APD 116.

The per-VF firmware 232 is "per-VF" in the sense that a different version of firmware is capable of being executed for different virtual functions. Note that it is possible for all virtual functions to execute different firmware versions, some to execute the same and other to execute different firmware versions, or all virtual functions to execute the same firmware version. "A different version of firmware being capable of being executed for different virtual functions" means that some or all of the virtual functions execute the same or different firmware versions. To cause different firmware to run when a virtualization context switch occurs, the per-VF firmware addresses 233 are configured, e.g., at initialization time—that is, when the processor 102 configures the work engine 117 when a virtual machine is started—to include addresses of the per-VF firmware 232. The per-VF firmware addresses 233 correlate virtual functions with associated firmware instances. When the virtualization scheduler 236 performs a virtualization context switch from a current virtual function to a subsequent virtual function, the virtualization scheduler 236 causes the microcontroller 230 to examine the per-VF firmware addresses 233 for the address for the firmware instance associated with the subsequent virtual function and to execute that firmware. The virtualization context switch also includes performing a "reset" on the work engine 117, which causes work for the current virtual function to stop in the hardware accelerator(s) 234 and microcontroller(s) 230 and causes the hardware accelerator(s) 234 and microcontroller 230 to restart. With the restart, the virtualization scheduler 236 performs a reinitialization of the hardware accelerator(s) 234 and reprograms the firmware location for the microcontroller 230. Once the re-initialization and reprogramming are done, the virtualization scheduler 236 causes the hardware accelerator(s) 234 and microcontroller 230 to start processing any pending jobs.

Figure 5:
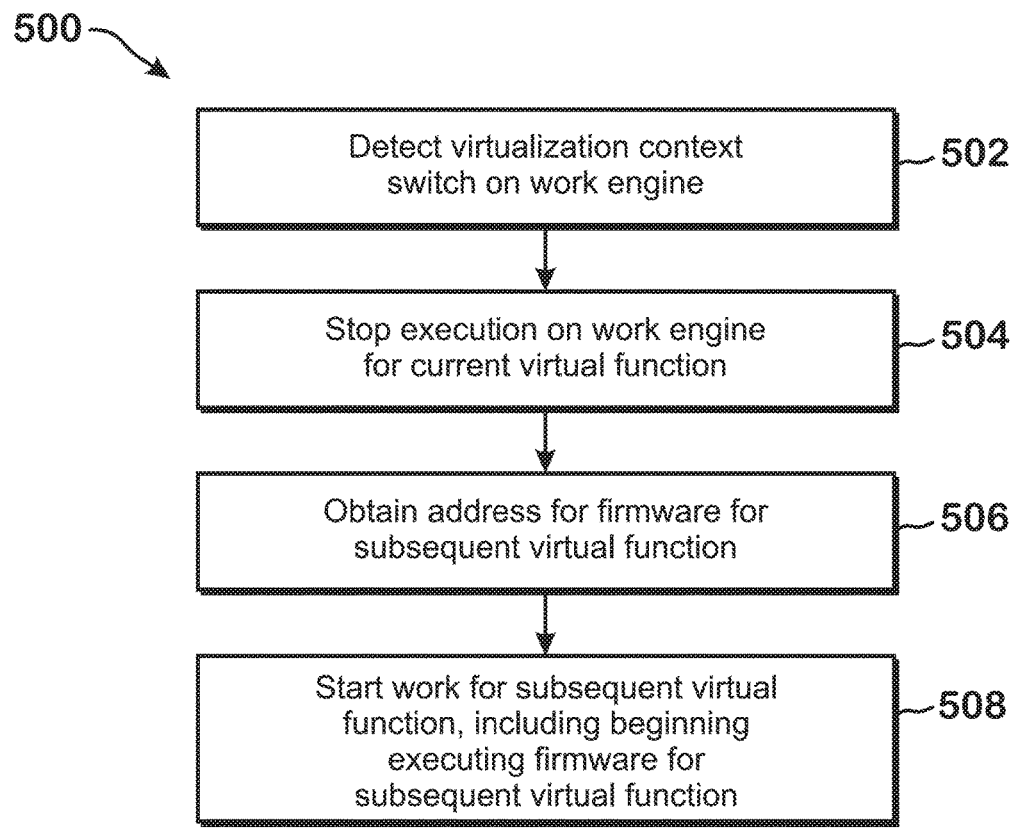
FIG. 5 is a flow diagram of a method for varying firmware on a virtualized device, according to an example.

FIG. 5 is a flow diagram of a method 500 for varying firmware on a virtualized device, according to an example. Although described with respect to the system of FIGS. 1-4, it should be understood the method 500, performed by any system, with steps as illustrated or in any other technically feasible order, falls within the scope of the present disclosure.

The method 500 begins at step 502, where a work-engine 117 determines that a virtualization context switch is to occur on the work-engine 117. In various implementations, this determination is made by a virtualization scheduler 236 of the work-engine 117, or a virtualization scheduler elsewhere in the device. Further, in some implementations, this determination is made after a time expires for the current time-slice for the current virtual function.

At step 504, the virtualization scheduler 236 stops execution of work on the work engine for the current virtual function. At step 506, the work-engine 117 obtains an address for firmware for a subsequent virtual function. At step 508, the work-engine 117 starts work for the subsequent virtual function, including beginning executing the firmware for the subsequent virtual function.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for executing a first firmware and a second firmware differing from the first firmware on a virtualized device, the method comprising:

detecting a virtualization context switch for the virtualized device from a current function to a subsequent function, wherein the virtualization context switch comprises a switch from performing work for a first virtual machine to performing work for a second virtual machine, wherein the work for the first virtual machine is performed with the first firmware, wherein the work for the second virtual machine is performed with the second firmware, wherein the first virtual machine is associated with the current function, and wherein the second virtual machine is associated with the subsequent function;

in response to the virtualization context switch, stopping the first firmware on the virtualized device for the current function; and in response to the virtualization context switch, causing the virtualized device to execute the second firmware for the subsequent function, wherein the current function is different than the subsequent function, the first virtual machine is different than the second virtual machine, and the work performed for the first virtual machine is different than the work performed for the second virtual machine.

2. The method of claim 1, further comprising performing the virtualization context switch by:
stopping operations on the virtualized device for the current function; and
starting operations on the virtualized device for the subsequent function.

3. The method of claim 1, wherein:
the virtualized device is incorporated within a virtualized computing device including a processor that executes a plurality of virtual machines; and
virtualization context switches on the virtualized device are performed asynchronously with respect to virtualization context switches for the processor that executes the plurality of virtual machines.

4. The method of claim 1, wherein:
the first firmware and the second firmware include instructions for controlling a hardware accelerator of the virtualized device.

5. The method of claim 4, wherein:
the first firmware and the second firmware include instructions to process data for the virtualized device.

6. The method of claim 1, further comprising:
configuring the virtualized device by storing addresses corresponding to the first firmware and the second firmware at memory locations associated with the virtualized device.

7. The method of claim 6, wherein causing the virtualized device to execute the second firmware comprises causing the virtualized device to read the memory locations to obtain the address corresponding to the second firmware and to execute instructions at that address.

8. The method of claim 1, wherein the virtualized device performs work at the request of either or both of a virtual machine and an accelerated processing device.

9. The method of claim 1, wherein the virtualized device includes a hardware-accelerated video encoder.

10. A virtualized device, comprising:
a microcontroller; and
a virtualization scheduler configured to:
detect a virtualization context switch for the virtualized device from a current function to a subsequent function, wherein the virtualization context switch comprises a switch from performing work for a first virtual machine to performing work for a second virtual machine, wherein the work for the first virtual machine is performed with a first firmware, wherein the work for the second virtual machine is performed with a second firmware differing from the first firmware, wherein the first virtual machine is associated with the current function, and wherein the second virtual machine is associated with the subsequent function;
in response to the virtualization context switch, stop the first firmware on the microcontroller for the current function; and
in response to the virtualization context switch, cause the microcontroller to execute the second firmware for the subsequent function, wherein the current function is different than the subsequent function, the first virtual machine is different than the second virtual machine, and the work performed for the first virtual machine is different than the work performed for the second virtual machine.

11. The virtualized device of claim 10, wherein the virtualization scheduler is configured to perform the virtualization context switch by:
stopping operations on the virtualized device for the current function; and
starting operations on the virtualized device for the subsequent function.

12. The virtualized device of claim 10, wherein:
the virtualized device is incorporated within a virtualized computing device including a processor that executes a plurality of virtual machines; and
virtualization context switches on the virtualized device are performed asynchronously with respect to virtualization context switches for the processor that executes the plurality of virtual machines.

13. The virtualized device of claim 10, further comprising:
a hardware accelerator, wherein the first firmware and the second firmware include instructions for controlling the hardware accelerator.

14. The virtualized device of claim 13, wherein:
the first firmware and the second firmware include instructions to process data for the virtualized device.

15. The virtualized device of claim 10, further comprising:
memory storing addresses corresponding to the first firmware and the second firmware.

16. The virtualized device of claim 15, wherein the virtualization scheduler is configured to cause the microcontroller to execute the second firmware by:
causing the virtualized device to read the memory locations to obtain the address corresponding to the second firmware and to execute instructions at that address.

17. The virtualized device of claim 10, wherein:
the microcontroller is configured to perform work at the request of either or both of a virtual machine and an accelerated processing device.

18. The virtualized device of claim 10, further comprising:
a hardware-accelerator configured to perform video encoding operations at the direction of the microcontroller.

19. A device comprising:
a processor; and
a virtualized device configured to perform request work at the work request of the processor, the virtualized device comprising:
a microcontroller; and
a virtualization scheduler configured to:
detect a virtualization context switch for the virtualized device from a current function to a subsequent function, wherein the virtualization context switch comprises a switch from performing work for a first virtual machine to performing work for a second virtual machine, wherein the work for the first virtual machine is performed with a first firmware, wherein the work for the second virtual machine is performed with a second firmware differing from the first firmware, wherein the first virtual machine is associated with the current function, and wherein the second virtual machine is associated with the subsequent function;
in response to the virtualization context switch, stop the first firmware on the microcontroller for the current function; and
in response to the virtualization context switch, cause the microcontroller to execute the second firmware for the subsequent function, wherein the current function is different than the subsequent function, the first virtual machine is different than the second virtual machine, and the work performed for the first virtual machine is different than the work performed for the second virtual machine.

20. The device of claim 19, wherein the virtualization scheduler is configured to perform the virtualization context switch by:

stopping operations on the virtualized device for the current function; and starting operations on the virtualized device for the subsequent function.

* * * * *